United States Patent [19]
Kester

[11] Patent Number: 6,091,016
[45] Date of Patent: Jul. 18, 2000

[54] SOLAR PANEL ASSEMBLY

[75] Inventor: Gerardus Joseph Adrianus Nicolaas Kester, Vinkeveen, Netherlands

[73] Assignee: Fokker Space B. V., Leiden, Netherlands

[21] Appl. No.: 09/026,430

[22] Filed: Feb. 19, 1998

[30]     Foreign Application Priority Data

Dec. 24, 1997  [EP]  European Pat. Off. .............. 97204099

[51] Int. Cl.[7] .................................................. H01L 25/00
[52] U.S. Cl. ............................................ 136/245; 136/292
[58] Field of Search ...................... 136/245, 292

[56]     References Cited

U.S. PATENT DOCUMENTS 3,326,497  6/1967  Michelson ................................. 136/245
5,833,176  11/1998  Rubin et al. ............................. 136/245

*Primary Examiner*—Mark Chapman
*Attorney, Agent, or Firm*—Young & Thompson

[57]     ABSTRACT

Solar panel assembly comprising a number of rectangular panels each carrying solar cells on one of the two main surfaces, said panels being interconnected by mutually parallel hinges such that the assembly from a first state, in which the panels are folded zigzag wise into a package, can be brought into a second state in which the package is unfolded and the panels are situated alongside each other in one plane. In the unfolded state each panel is curved in a direction parallel to the panel edges to which said hinges are attached.

16 Claims, 3 Drawing Sheets

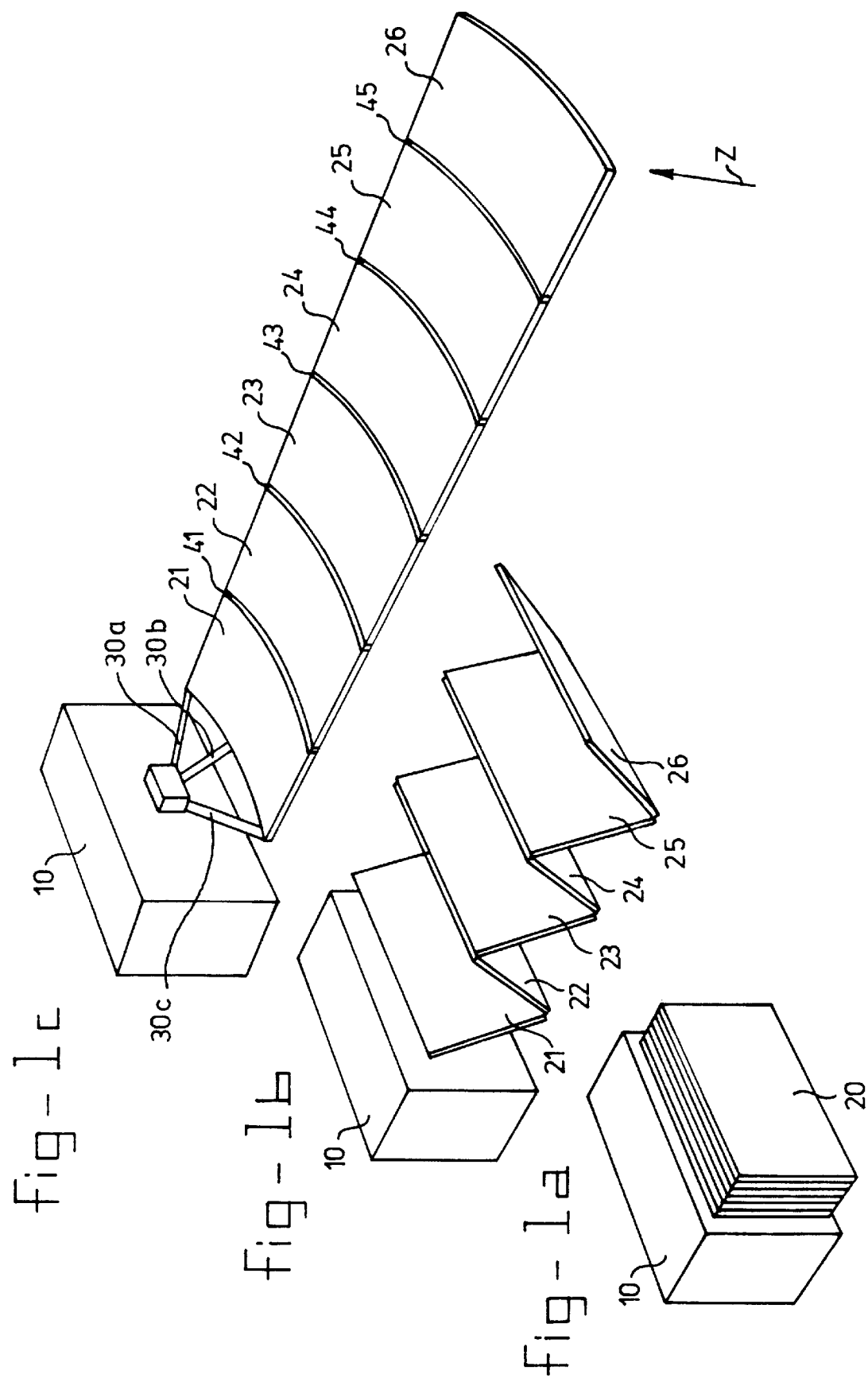

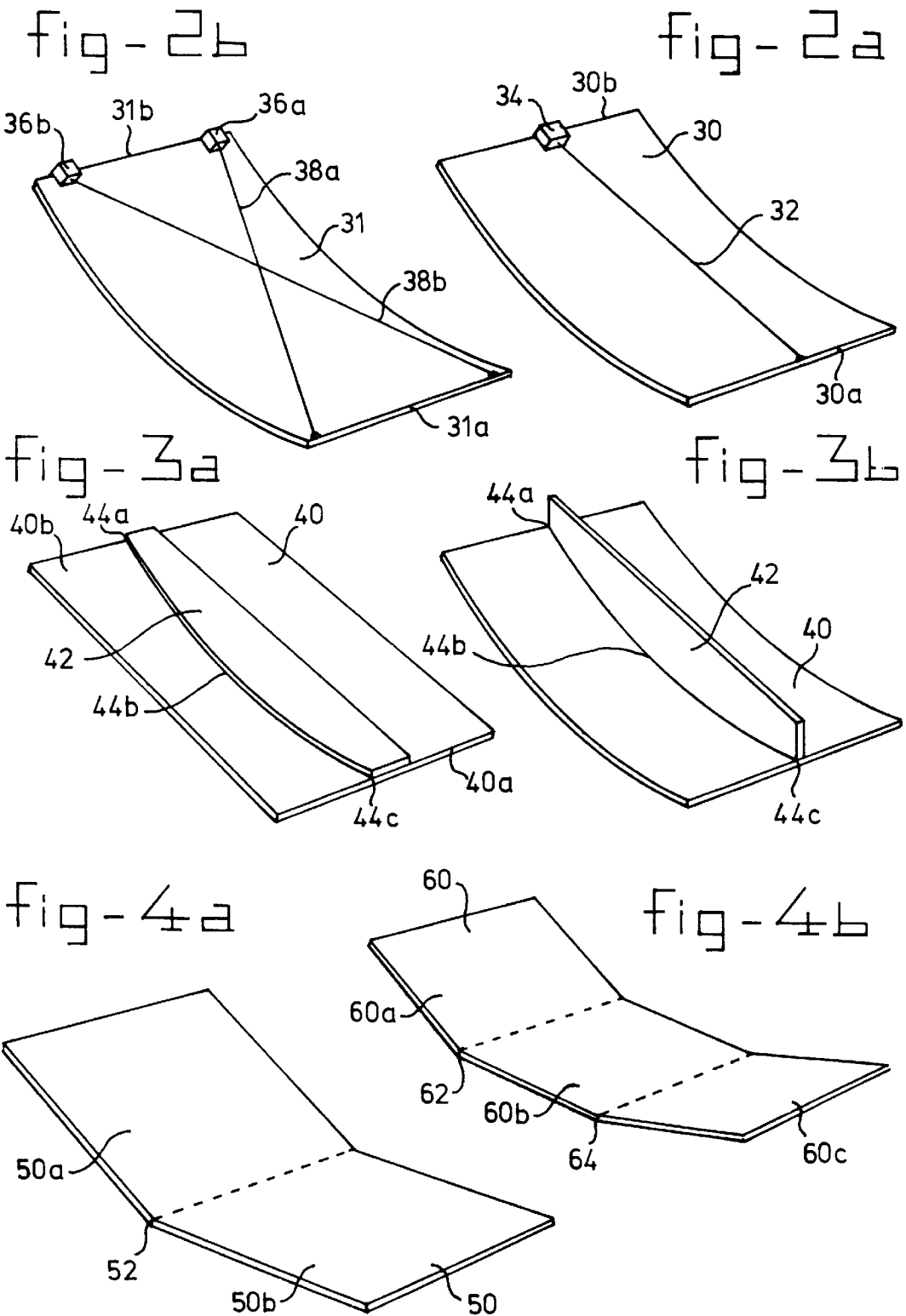

SOLAR PANEL ASSEMBLY

The invention relates to a solar panel assembly comprising a number of rectangular panels each carrying solar cells on one of the two main surfaces, said panels being interconnected by mutually parallel hinges such that the assembly from a first state, in which the panels are folded zigzag wise into a package, can be brought into a second state in which the package is unfolded and the panels are situated alongside each other in one plane.

Such solar panel assemblies are generally known. Typical examples are described as state of the art in U.S. Pat. No. 5,31,905, U.S. Pat. No. 5,520,747 and EP-0,120,662.

Before transport the panels of such a solar panel assembly are folded zigzag-wise into a package of which the length and width correspond approximately with the length and width of one separate panel and of which the thickness corresponds approximately with the thickness of one panel multiplied by the number of panels. In this state the assembly is transported from the earth into an orbit in space. In general the transporting vehicle (rocket, space shuttle, etc.) is able to transport payloads of rather restricted dimensions and restricted weight. Therefore, it is required in general that solar panel assemblies have a low weight and dimensions which should be within certain limits. To maintain a low weight one could use stiffness-efficient constructions having a sufficient strength, such as constructions comprising a lot of air and still having a sufficient stiffness and strongness, such as for instance honeycomb sandwich panels.

In general the only way to reduce the dimensions of a solar panel assembly is to reduce the thickness of the actual panels. In case honeycomb sandwich constructions are used the only reduction possibility is to reduce the dimensions of the core. The surface, i.e. the length and width of each panel, will be selected as large as possible to obtain a large useful area for locating solar cells.

A too far reduction of the weight may lead to a construction having a too small stiffness, both in stowed configuration and in the fully deployed configuration. During operation that may lead to harmful bending and torsion movements or oscillating movements of the individual panels or of the assembly as a whole in its extended second state. Such movements may occur for instance in the situation in which the position of the assembly in relation to the carrying satellite has to be corrected.

The object of the invention is now to indicate how the constructive stiffness of the extended solar panel assembly can be improved still allowing the use of relative thin constructions and lightweight materials for the panels.

In agreement with said object the invention now provides an assembly as described in the first paragraph, characterized in that in the unfolded state each panel is curved in a direction parallel to the panel edges to which said hinges are attached.

In a very basic embodiment each panel shows only one curve, defining a concave or convex shape of the assembly. Said one curve could be sinusoidal, elliptical, circular, or any other bow shape.

In a more complex embodiment each panel shows two or more adjacent curves. These adjacent curves can define a number of adjacent concave (or convex) surface sections of the assembly. On the other hand the adjacent curves can also define alternating convex and concave surface sections of the assembly. In that case the assembly in its unfolded state looks like a corrugated board.

The curves as such can be made in different ways. Conceivable is that each curve is obtained as a fluent bend of the panel. Also conceivable is that each curve is obtained by a discrete number of bends with flat panel sections in between.

In a preferred embodiment the panels are made of a resilient preformed material such that in the folded state each panel is stretched to a flat shape, whereas after unfolding each panel resumes its preformed curved shape. In that case no separate shaping or tensioning means are necessary in space to obtain the curved shape of the various panels. However, during transport from earth into orbit the panels have to be stretched into a flat shape, which under circumstances could be considered a disadvantage because, for example, of the stresses on the skins.

In another preferred embodiment the panels are formed as flat panels and the assembly comprises mechanical means which after unfolding of the assembly can be activated to obtain the desired curvatures in the panels. In that case there is no stress in the panels during transport into orbit, but separate means containing sufficient energy to pre-load the panels are necessary to obtain the curved shape of the panels.

The above-mentioned mechanical means may consist of tensioning means connected at least to both side edges (the edges not connected to the hinges) of a panel being able to draw these to side edges towards each other over a predetermined distance.

As an example the tensioning means comprise wires and fasteners for shortening the length of said wires.

As alternative the mechanical means may comprise a number of bow shaped bridging elements, initially lying flat on the surface of a panel, connected near the side edges to the respective panel and connected with its bow shaped side at at least one further place to the surface of said panel, such that after bringing this bridging element into a state wherein it projects from the surface the panel is forced to assume its desired curved shape.

In all embodiments the hinges interconnecting the various panels should allow the reshaping of the panels. In other words it is preferred that the hinges are embodied such that the transformation from a flat panel into a curved panel is not impeded. As an example the hinges could be formed as stripes of a resilient material. The hinges can also be embodies as elongated hinges extending along the major part of the edges to be interconnected and having enough flexibility to enable curving of the respective panels. As alternative the hinges can be embodied as relatively small hinges of arbitrary construction, a number of which are, in a bow, attached to the edges to be interconnected.

The invention will now be explained in more detail with reference to the attached drawings.

FIG. 1 illustrates three views on a first embodiment of a solar panel assembly according to the invention. FIG. 1a shows the folded situation during transport, FIG. 1b the situation during unfolding and FIG. 1c the ultimate extended position during operation in space.

FIGS. 2a and 2b illustrates a second embodiment of an assembly according to the invention in which tensioning wires are used to obtain the bended shape.

FIG. 3 illustrates a third embodiment of an assembly according to the invention in which a bow shaped bridge is used. FIG. 3a shows the bridge resting against the surface of the panel and FIG. 3b shows the bridge in the active outwards projecting state tensioning the panel into a bow shape.

FIGS. 4a and 4b illustrate two embodiments in which the bow shape is not obtained by a fluent bend but obtained by a discrete number of relatively sharper bends with flat panel sections in between.

Figure 5:
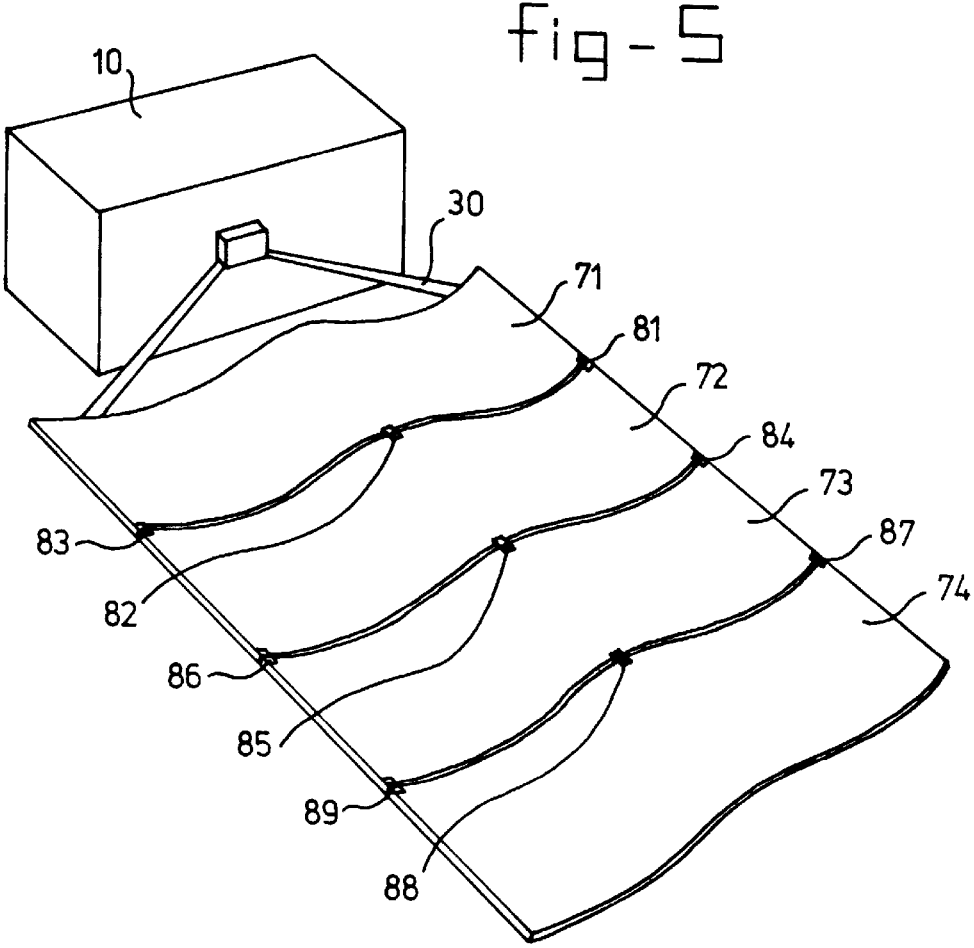
FIG. 5 illustrates an embodiment wherein the unfolded solar panel assembly has the appearance of a corrugated board, whereby each panel shows three alternating curves.

The FIGS. 1a, 1b and 1c illustrate very schematically a satellite 10 comprising a defoldable solar panel assembly 20. Through a yoke mechanism 30 the solar panel assembly 20 is connected to the actual satellite 10.

In FIG. 1a the situation during transport from the earth to the orbit is illustrated. The solar panel 20 is folded and located directly adjacent to the central body of the satellite 10. In this state the whole assembly occupies only a limited volume and fits in the cargo space of the transport vehicle (rocket, space shuttle, etc.) such that the available space is used optimally. The forces of the holddown or the restraint points ensure that the panels are tightly stowed during launch.

In FIG. 1b the situation is illustrated during the refolding or defolding operation of the panel assembly. It is assumed that the satellite 10 has reached its orbit and has received instructions to defold the assembly 20. In FIG. 1b the separate panels 21, 22, 23, 24, 25 and 26 of the solar panel assembly are already visible.

In FIG. 1c the ultimate situation is illustrated whereby all panels 21, . . . , 26 of the solar panel assembly 20 are in one plane. In FIG. 1c furthermore the hinges between the various panels are indicated with reference numbers 41, 42, 43, 44 and 45. It is assumed in all FIGS. 2a, 2b and 2c that the solar cells are installed at the non visible underside and that the solar radiation impinges on the panel from the direction Z.

As clearly visible in FIG. 1c all panels are slightly bended and because of that the curved panels have obtained an inherent stiffness. The panels are made of a material which is sufficiently resilient to bring the whole assembly into the state illustrated in FIG. 1a. Thereby the panels are forced into a flat shape. After unfolding the package each panel resumes its original slightly bended shape.

Preferably, the yoke 30 has three arms 30a, 30b, 30c. The ends of these arms, which are connected to the first panel 21, are preferably located at a curved line such that this panel 21 is more or less forced into a curved state. In this manner even panels which are straight themselves can be forced into a bended shape.

The detailed construction of the yoke 30 is considered known to the expert reader and therefore further explanation of its construction and operation is considered superfluous.

To be able to obtain its curved shape the various hinges 41, . . . , 45 should have sufficient flexibility to allow the assembly as a whole to obtain its curved shape. That implies that each of the hinges is made of a construction with inherent flexibility or is made of material which as such is flexible enough. Various solutions are considered within reach of the expert reader, so that the provision of further details is considered superfluous.

FIG. 2a illustrates an embodiment of one panel of an assembly according to the invention in which tensioning wires are used to obtain the bended curved shape. One panel 30 is shown which originally is a flat panel. By means of a wire the panel is bended. The tensioning wire is attached to the side edge 30a and through a fastener 34 to the side edge 30b (the edges not occupied by the interconnecting hinges). In the folded state of the assembly there is no tension on the wire and the panel is flat. After unfolding the assembly the fastening means 34 receive an instruction to shorten the length of the wire 32 such that the panel becomes bended and obtains a predetermined bow shape as illustrated. The fastener means for operating the wire can have various embodiments and are assumed known to the solar panel technician so that a further explanation thereof is superfluous.

Instead of a fastener also a shrinking wire can be used of which the length will shrink under the influence of for instance an electrical current, heat, etc.

FIG. 2b illustrates a more preferred embodiment of an assembly according to the invention in which two crosswise extending tensioning wires 38a and 38b (or shrinking wires) are used to obtain the curved shape. The tensioning wires are attached to the edges 31a and 31b of the panel 31 whereby fasteners 36a and 36b are installed to tension the wires and bring the panel from its flat shape into the desired curved shape. The use of two wires results into additional advantages. Two cross wires provide an additional stiffness in comparison with the situation with only one tensioning wire. Furthermore, each wire will backup for the other, in case one of the wires fails to perform its function then there is still the other wire.

FIG. 3 illustrates a third embodiment of an assembly according to the invention in which a bow shaped bridge is used for bending the panel. FIG. 3a shows the bridge 42 resting against the surface of the panel 40. The bridge 42 is connected by means of flexible or adjustable connections 44a, 44b and 44c to the panel 40 near the side edges 40a and 40b thereof. At least one further flexible connection 44b is made somewhere in between the connections 44a and 44c. After unfolding the assembly the bridge 42 is moved upwards by not illustrated means into an active outwards projecting state as illustrated in FIG. 3b tensioning the panel 40 into a bow shape.

Instead of a fluent slow bend as in FIGS. 1, 2 and 3 also a discrete number of relatively sharper bends with flat panel sections in between can lead to the desired result. Examples thereof, which fall within the scope of the invention, are illustrated in FIGS. 4a and 4b. FIG. 4a illustrates an embodiment in which a panel 50 by means of a relatively sharp bend 52 is divided into two flat sections 50a and 50b. Through this sharp bend 52 the panel 50 as a whole has obtained a bow shape and falls within the scope of the invention. The material of the panel should have a certain flexibility at least around the bend area 52 to enable folding the panels into a package in which the panels are forced into a substantially flat shape.

FIG. 4b illustrates an embodiment in which a panel 60 by means of two relatively sharp bends 62 and 64 is divided into three flat sections 60a, 60b and 60c. Through these sharp bends 62 and 64 the panel 60 as a whole has obtained a bow shape and falls within the scope of the invention. Also in this embodiment the material of the panel should have a certain flexibility at least around the bend areas 62 and 64 to enable folding the panels into a package in which the panels are forced into a substantially flat shape.

FIG. 5 illustrates an embodiment of an solar panel assembly according to the invention whereby the assembly has the appearance of a corrugated board. The assembly is shown in its unfolded state in space and comprises four panels 71, 72, 73, and 74 which are hingedly attached to each other. Instead of elongated hinges of a rather flexible material, as is assumed in the embodiment of FIG. 1c, the various panels 71, . . . , 74 are interconnected by means of a restricted number of small hinges, in this case three hinges between each combination of two solar panels. The nine hinges are indicated by 81, . . . , 89.

To obtain the corrugated shape illustrated in FIG. 5 one could use panels made of a preformed material. The panels in their untensioned state have the shown corrugated shape. The panels have to be resilient enough to enable folding them into a package as illustrated in FIG. 1a whereby each panel is forced to adopt a straight shape.

Figure 6:
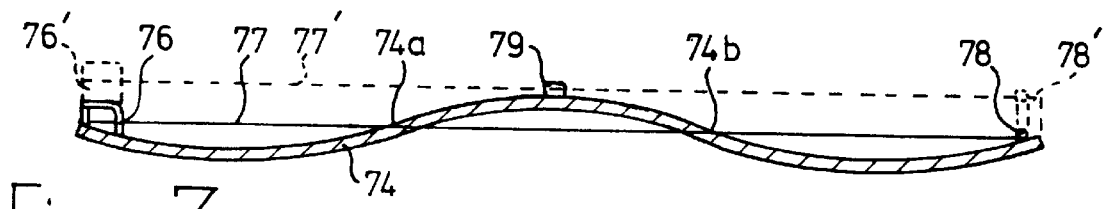
FIG. 6 shows a cross section through one of the panels in FIG. 5.

However, as illustrated in FIG. 6, also the use of tensioning wires is conceivable. In FIG. 6 a cross section through one of the panels 74 is shown. The panel has two small openings 74a and 74b through which a wire 77 extends. One end of the wire is connected to a fastener 76 attached to one edge of the panel 74 and the other end of the wire 77 is connected at 78 to the other opposed edge of the panel 74. If the wire is tensioned by means of the fastener 76 then the panel will obtain a curved shape with in this case three alternating curves.

In FIG. 6 part of the wire 77 extends across the lower surface of the assembly, i.e. the surface on which the sunlight is impinging. An alternative embodiment wherein the wire 77' extends solely across the upper surface of the assembly is illustrated in dashed lines. On the left-hand side an upstanding fastener 76' is attached to the assembly whereas at the right-hand side an extending mounting element 78' is fastened to the assembly. The wire 77' is attached to the element 78' and to the fastener 76' and runs in the centre of the assembly through a ring-shaped element 79'.

The embodiment shown in cross section in FIG. 6 has three adjacent curves. More especially the shown embodiment has alternating convex and concave curves which fluently pass into each other.

Figure 7:
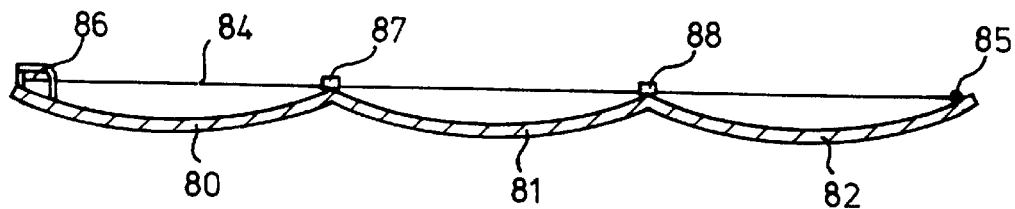
FIG. 7 shows a cross section through another embodiment wherein each panel has a number of adjacent concave (or convex) curves.

The embodiment illustrated in cross section in FIG. 7 has a number of adjacent curves, each formed as a concave (or convex) section. The three sections are indicated by 80, 81, and 82. If this panel is made of a preformed material then no further measures are necessary for shaping the panel. However, if the panel is originally flat, then for instance a wire 84 could be used to shape the panel in its desired curved form. At the right-hand side of the figure the wire 84 is, at 85, connected to one edge of the panel, whereas at the left-hand side a fastener 86 is used to connect the wire to the respective edge of the panel. The wire extends through two ring-shaped elements 87 and 88 fixed to the panel at the transition of two curves.

It is claimed:

1. In a solar panel assembly comprising a number of rectangular panels each carrying solar cells on one of the two main surfaces, said panels being interconnected by hinges such that the assembly from a first state, in which the panels are folded zigzag wise into a package, can be brought into a second state in which the package is unfolded and the panels are situated alongside each other in one plane; the improvement wherein in the unfolded state each panel is curved in a direction parallel to the panel edges to which said hinges are attached, whereby the panel edges to which said hinges are attached are non-rectilinear.

2. Solar panel assembly according to claim 1, wherein each panel shows only one curve, defining a concave or convex shape of the assembly.

3. Solar panel assembly according to claim 1, wherein each panel shows two or more adjacent curves.

4. Solar panel assembly according to claim 3, wherein the adjacent curves define a number of adjacent concave or convex surface sections of the assembly.

5. Solar panel assembly according to claim 3, wherein the adjacent curves define alternating convex and concave surface sections of the assembly.

6. Solar panel according to claim 1, wherein each curve is obtained as a fluent bend of the panel.

7. Solar panel assembly according to claim 1, wherein each curve is obtained by a discrete number of bends with flat panel sections in between.

8. Solar panel assembly according to claim 1, wherein the panels are made of a resilient preformed material such that in the folded state of the assembly each panel is stretched to a flat shape, whereas after unfolding each panel resumes its preformed curved shape.

9. Solar panel assembly according to claim 1, wherein the panels are formed as flat panels and the assembly comprises mechanical means which after unfolding of the assembly can be activated to obtain the desired curvatures in the panels.

10. Solar panel assembly according to claim 9, wherein the mechanical means consist of tensioning means connected at least to both side edges not connected to the hinges of a panel being able to draw these two side edges towards each other over a predetermined distance.

11. Solar panel assembly according to claim 10, wherein the tensioning means comprise plural crossing tensioning members extending in opposite diagonal directions across at least one said panel.

12. Solar panel assembly according to claim 9, wherein the tensioning means comprise wires and fasteners for shortening the length of said wires.

13. Solar panel assembly according to claim 9, wherein the tensioning means comprise a number of bow shaped bridging elements, initially lying flat on the surface of a panel, connected near the side edges to the respective panel and connected with its bow shaped side at at least one further place to the surface of said panel, such that after bringing this bridging element into a state wherein it projects from the surface the panel is forced to assume its desired curved shape.

14. Solar panel assembly according to claim 1, wherein the hinges are embodied such that the transformation from a flat panel into a curved panel is not impeded.

15. Solar panel assembly according to claim 14, wherein the hinges are embodied as elongated hinges extending along the major part of the edges to be interconnected and having enough flexibility to enable curving of the respective panels.

16. Solar panel assembly according to claim 14, wherein the hinges are embodied as relatively small hinges of arbitrary construction, a number of which are, in a bow, attached to the edges to be interconnected.

\* \* \* \* \*